United States Patent [19]

Ogawa et al.

[11] Patent Number: 5,047,475

[45] Date of Patent: Sep. 10, 1991

[54] DELUSTERED THERMOPLASTIC RESIN COMPOSITION WITH GOOD IMPACT RESISTANCE

[75] Inventors: Takuya Ogawa, Nagoya; Masatoshi Iwamoto, Aichi; Kazumasa Chiba; Kazuhisa Yano, both of Nagoya, all of Japan

[73] Assignee: Toray Industries, Inc., Japan

[21] Appl. No.: 389,165

[22] Filed: Aug. 3, 1989

[30] Foreign Application Priority Data

Aug. 3, 1988 [JP] Japan .................. 63-194244
Apr. 4, 1989 [JP] Japan .................. 1-86334
Apr. 4, 1989 [JP] Japan .................. 1-86335

[51] Int. Cl.$^5$ .................. C08L 51/04; C08L 55/02
[52] U.S. Cl. .................. 525/73; 525/70; 525/74
[58] Field of Search .................. 525/74, 73, 20

[56] References Cited

U.S. PATENT DOCUMENTS

| | | | |
|---|---|---|---|
| 4,458,060 | 7/1984 | Yamane et al. | 525/292.3 |
| 4,460,742 | 7/1984 | Kishida et al. | 524/504 |
| 4,464,813 | 8/1984 | Kishida et al. | 525/239 |
| 4,554,316 | 11/1985 | Sakano et al. | 525/71 |
| 4,694,032 | 9/1987 | Kakimoto et al. | 524/210 |
| 4,761,463 | 8/1988 | Matsumo et al. | 525/74 |
| 4,877,844 | 10/1989 | Kishida et al. | 525/87 |
| 4,900,787 | 2/1990 | Sakano et al. | 525/83 |

OTHER PUBLICATIONS

Abstract of Japanese Patent 61-89240, 5/86, Oshida et al.

Abstract of Japanese Patent 63-156851, 6/88, Matsumoto.

Primary Examiner—Allan M. Lieberman
Attorney, Agent, or Firm—Austin R. Miller

[57] ABSTRACT

Disclosed is a resin composition comprising (A) from 1-98 wt. parts of a graft copolymer obtained by graft-polymerizing (a) 5-80 wt. % of a rubbery polymer and (b) 95-20 wt. % of a monomer mixture consisting of 40-90 wt. % of an aromatic vinyl compound, 60-10 wt. % of a vinyl cyanide compound and 0-50 wt. % of another ethylenically unsaturated compound copolymerizable therewith, (B) 1-40 wt. % parts of a modified copolymer selected from ($B_1$) a modified vinyl copolymer obtained by polymerizing (a) 40-90 wt. % of an aromatic vinyl compound, (b) 60-10 wt. % of a vinyl cyanide compound, (c) 0.01-10 wt. % of a monomer having an epoxy, carboxyl or amino group, and (d) 0-40 wt. % of another ethylenically unsaturated compound, and ($B_2$) a modified olefinic copolymer obtaind by co-polymerizing (e) 50-95 wt. % of ethylene or propylene, (f) 0.1-20 wt. % of a monomer having an epoxy, carboxyl or amino group, and (g) 0-40 wt. % of another ethylenically unsaturated compound, (C) 1-60 wt. parts of an imidized acrylic resin, and (D) from 0-90 wt. parts of a vinyl copolymer obtained by polymerizing (a) 40-90 wt. % of an aromatic vinyl compound, (b) 60-10 wt. % of a vinyl cyanide compound and (c) 0-40 wt. % of another ethylenically unsaturated compound, wherein the content of the rubbery polymer (a) in the graft copolymer (A) is 5 to 40 wt. % based on the resin composition. This resin composition gives a shaped article having a delustered and pleasing appearance and a good impact resistance.

10 Claims, No Drawings

DELUSTERED THERMOPLASTIC RESIN COMPOSITION WITH GOOD IMPACT RESISTANCE

BACKGROUND OF THE INVENTION

1. Field of the Invention

The present invention relates to a thermoplastic resin composition providing a shaped article having a delustered and pleasing appearance and a good impact resistance.

2. Description of the Related Art

Thermoplastic resins generally have light weight, good moldability and good electrically insulating property. Accordingly, thermoplastic resins are used in the fields of interior trims of automobiles, parts of households electrical applicances and the like. However, these articles have in general a high gloss. To imparted high-quality feeling molded articles having a reduced surface gloss have been proposed, and the demand for these molded articles has been increasing. Moreover, molded articles having a high surface gloss dazzle the user's vision and cause a problem of the safety, and low-gloss molded articles are desired for solving this problem.

As ordinary delustering methods for thermoplastic resins, there are known a method using a mold having the entire surface embossed, a method comprising coating the surface of a molded article with a liquid delustering agent, a method comprising incorporating an inorganic filler into a resin (Japanese Examined Patent Publication No. 49-44582), a method comprising adding a rubbery polymer after the polymerization (Japanese Examined Patent Publication No. 48-24034, Japanese Unexamined Patent Publication No. 54-142259 and Japanese Examined Patent Publication No. 62-59725), a method comprising adding a rubber-modified thermoplastic resin (Japanese Unexamined Patent Publication No. 56-133353, No. 59-89346, No. 60-18536, No. 60-202143 and No. 62-101616), and a method comprising incorporating a three-dimensional resin component formed by using a crosslinking monomer (Japanese Unexamined Patent Publication No. 63-63740).

In the method using a mold having the entire surface embossed, the mold-preparing cost increases and the repair and maintenance of the mold are complicated and troublesome, and no satisfactory delustering effect can be obtained. In the surface coating method, the coating step is expensive and there is a risk of deterioration of the resin surface by the solvent. In the method in which an inorganic filler is incorporated, the mechanical properties, especially the impact strength, are drastically degraded, and the appearance of the molded article becomes poor.

The method comprising adding a rubbery polymer after the polymerization causes reduction of heat resistance or rigidity, and the gloss is not uniformly reduced (uneven gloss). In the method comprising adding a rubber-modified thermoplastic resin, the delustering degree varies according to the molding conditions, and the method comprising adding a three-dimensional resin component formed by using a crosslinking monomer, the molding processability and the appearance of the molded article are poor.

Recently, a styrene resin delustered by introduction of epoxy groups has been proposed. For example, there have been proposed an ABS resin comprising an epoxy group-introduced graft copolymer as a constituent (Japanese Unexamined Patent Publication No. 61-218651), an ABS resin containing an epoxy group-containing copolymer (Japanese Unexamined Patent Publication No. 63-63740), and a delustered resin composition comprising an ABS resin and an epoxy group-containing olefin copolymer (Japanese Unexamined Patent Publication No. 59-89346).

Moreover, a resin composition comprising a rubbery polymer and an ethylenically unsaturated carboxylic acid copolymer which is delustered by incorporation of a metal compound, has been proposed (Japanese Unexamined Patent Publication No. 60-197713).

However, in the resin composition formed by mere introduction of an epoxy group or carboxyl group, the gloss is not satisfactorily reduced and the appearance of the molded article is not good.

Still further, a resin composition comprising polyglutarimide (PGI) and an ABS resin has been proposed (Japanese Unexamined Patent Publication No. 58-83057). This resin composition has excellent impact resistance and heat resistance, but the gloss is high.

Furthermore, there has been proposed a resin composition comprising polyglutarimide, a polymer of an acrylic rubber and an acrylic acid ester, and an ABS resin (U.S. Pat. No. 4,217,424). In this resin composition, the impact resistance of polyglutarimide can be improved, but the gloss is still high.

Still in addition, a resin composition comprising an imidized acrylic resin and a polyamide has been proposed (European Patent 474215, Japanese Unexamined Patent Publication No. 59-25836 and No. 59-117550), but no delustering effect is obtained in this composition.

The present assignee previously proposed a delustered thermoplastic resin composition comprising an ABS resin, a PGI resin and a vinyl type crosslinked copolymer comprising a polyfunctional monomer as a comonomer component (Japanese Unexamined Patent Publication No. 64-48848). The crosslinked copolymer in this composition is a polymer which has been partially crosslinked in advance, and this copolymer has no reactivity with PGI. For this reason or other reason, the composition is still unsatisfactory in surface appearance and impact resistance.

As the polyfunctional monomer, compounds having at least copolymerizable double bonds, preferably two copolymerizable double bonds, for example, non-conjugated divinyl compounds represented by divinylbenzene, diallyl maleate and polyvalent acrylate compounds, are used.

SUMMARY OF THE INVENTION

A primary object of the present invention is to provide a low-gloss thermoplastic resin composition providing a shaped article having a delustered surface and pleasing appearance and a good impact resistance.

Another object of the present invention is to provide a low-gloss thermoplastic resin composition having excellent rigidity and moldability.

Still another object of the present invention is to provide a low-gloss thermoplastic resin composition having excellent heat resistance.

More specifically, in accordance with the present invention, there is provided a resin composition comprising, based on 100 parts by weight of the resin composition, (A) from 1 to 98 parts by weight of a graft copolymer obtained by graft-polymerizing (a) from 5 to 80% by weight of a rubbery polymer and (b) from 95 to 20% by weight of a monomer mixture consisting of from 40 to 90% by weight of an aromatic vinyl compound, from 60 to 10% by weight of a vinyl cyanide compound and from 0 to 50% by weight of another ethylenically unsaturated compound copolymerizable therewith, (B) from 1 to 40 parts by weight of at least one modified copolymer selected from the group consisting of ($B_1$) a modified vinyl copolymer obtained by polymerizing (a) from 40 to 90% by weight of an aromatic vinyl compound, (b) from 60 to 10% by weight of a vinyl cyanide compound, (c) from 0.01 to 10% by weight of a monomer having at least one member selected from the group consisting of an epoxy group, a carboxyl group and an amino group, and (d) from 0 to 40% by weight of another ethylenically unsaturated compound, and ($B_2$) a modified olefinic copolymer obtained by copolymerizing (e) from 50 to 95% by weight of at least one olefin selected from the group consisting of ethylene and propylene, (f) from 0.1 to 20% by weight of a monomer having at least one member selected from the group consisting of an epoxy group, a carboxyl group and an amino group and (g) from 0 to 40% by weight of another ethylenically unsaturated compound copolymerizable therewith, (C) from 1 to 60 parts by weight of an imidized acrylic resin, and (D) from 0 to 90 parts by weight of a vinyl copolymer obtained by polymerizing (a) from 40 to 90% by weight of an aromatic vinyl compound, (b) from 60 to 10% by weight of a vinyl cyanide compound and (c) from 0 to 40% by weight of another ethylenically unsaturated compound copolymerizable therewith, wherein the content of the rubbery polymer (a) in the graft copolymer (A) is 5 to 40% by weight based on the total weight of the resin composition.

DESCRIPTION OF THE PREFERRED EMBODIMENTS

A rubbery polymer having a glass transition temperature not higher than 0° C. is preferable as the rubbery polymer (a) as the constituent of the graft copolymer (A) used in the present invention. Specifically, diene type rubbers such as polybutadiene, poly(styrene-/butadiene) and poly(acrylonitrile/butadiene), polyisoprene, polychloroprene, acrylic rubbers such as poly(butyl acrylate), and an ethylene/propylene/diene terpolymer can be used. Of these, polybutadiene and butadiene copolymers are preferable.

As the aromatic vinyl compound in the monomer mixture (b), there can be mentioned styrene, α-methylstyrene, vinyltoluene, o-ethylstyrene and o-chlorostyrene, and styrene and α-methyl styrene are especially preferable. These monomers can be used alone or in the form of mixtures of two or more thereof.

As the vinyl cyanide compound, there can be mentioned acrylonitrile, methacrylonitrile and ethacrylonitrile, and acrylonitrile is especially preferable.

The optional other copolymerizable ethylenically unsaturated compound is not particularly critical. However, one or more of alkyl esters of unsaturated carboxylic acids, for example, acrylic acid esters and methacrylic acid esters having an alkyl group having 1 to 10 carbon atoms, can be used.

As the acrylic acid ester, methyl acrylate, ethyl acrylate, n-propyl acrylate, n-butyl acrylate, t-butyl acrylate, hexyl acrylate and cyclohexyl acrylate can be mentioned. Methyl acrylate is especially preferred.

As the methacrylic acid ester, there can be mentioned methyl methacrylate, ethyl methacrylate, n-propyl methacrylate, n-butyl methacrylate, t-butyl methacrylate, hexyl methacrylate, cyclohexyl methacrylate and octyl methacrylate. Methyl methacrylate and ethyl methacrylate are especially preferable.

As another examples of the optional copolymerizable ethylenically unsaturated compound there can be mentioned acrylamide and methacrylamide type monomers such as acrylamide, methacrylamide, N-methylacrylamide and N,N-dimethylacrylamide, dicarboxylic anhydrides such as maleic anhydride and itaconic anhydride, and vinyl esters of carboxylic acids such as vinyl acetate, vinyl propionate and vinyl butyrate.

The graft copolymer (A) is obtained by graftpolymerizing 5 to 80 parts by weight, preferably 7 to 75 parts by weight, more preferably 10 to 70 parts by weight, of the rubbery polymer (a) with 95 to 20 parts by weight, preferably 93 to 25 parts by weight, more preferably 90 to 30 parts by weight, of a monomer mixture comprising 40 to 90% by weight, preferably 45 to 85% by weight, more preferably 50 to 80% by weight, of the aromatic vinyl compound, 60 to 10% by weight, preferably 55 to 12% by weight, more preferably 50 to 15% by weight of the vinyl cyanide compound and optionally, 0 to 50% by weight of another vinyl copolymerizable compound.

If the proportion of the rubber polymer (a) in the graft copolymer is smaller than 5 parts by weight, the impact resistance of the obtained resin is poor, and if the proportion of the rubbery polymer (a) exceeds 80 parts by weight, the rubbery polymer is not sufficiently dispersed and the appearance of the molded article becomes poor.

If the proportion of the aromatic vinyl compound is lower than 40% by weight, the moldability is poor, and if the proportion of the aromatic vinyl compound exceeds 90% by weight, the impact resistance and chemical resistance of the resin are not satisfactory.

If the proportion of the vinyl cyanide compound is lower than 10% by weight, the impact resistance of the obtained resin is poor, and if the proportion of the vinyl cyanide monomer exceeds 60% by weight, the thermal stability of the graft copolymer is drastically degraded and the obtained molded article is poor in the hue.

As the graft polymerization process, there can be mentioned known polymerization processes such as a process in which the monomer mixture having the abovementioned composition and a polymerization initiator are continuously supplied and emulsion graft polymerization is carried out in the presence of a latex of the rubbery polymer.

As the aromatic vinyl compound (a) and vinyl cyanide compound (b) constituting the copolymer ($B_1$), those mentioned above with respect to the graft copolymer (A) can be similarly used.

The monomer (c) having an epoxy group in the molecule is a compound having both a radicalpolymerizable vinyl group and an epoxy group. Examples of the monomer of this type include glycidyl esters of unsaturated carboxylic acid, unsaturated glycidyl ethers and epoxy group-containing alkenes represented by the following general formulae:

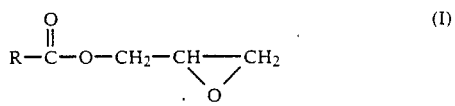

wherein R represents an aliphatic or aromatic hydrocarbon group having an ethylenically unsaturated bond and 2 to 10 carbon atoms, $$R-O-CH_2-CH\underset{O}{-}CH_2 \quad (II)$$

wherein R represents an aliphatic or aromatic hydrocarbon group having an ethylenically unsaturated bond and 2 to 10 carbon atoms, and $$R^1-\underset{\underset{O}{|}}{\overset{R^2}{\underset{|}{C}}}-CH_2 \quad (III)$$

wherein $R^1$ represents an aliphatic or aromatic hydrocarbon group having an ethylenically unsaturated bond and 2 to 10 carbon atoms, and $R^2$ represents a hydrogen atom or a methyl group.

As specific examples, there can be mentioned glycidyl acrylate, glycidyl methacrylate, glycidyl ethacrylate, glycidyl itaconate, allyl glycidyl ether, 2 methylallyl glycidyl ether, 4-vinylphenyl glycidyl ether, 4,5-epoxy-1-pentene, 5,6-epoxy-1-hexene and p-glycidylstyrene. These compounds can be used alone or in the form of mixtures of two or more thereof.

As the monomer (c) having a carboxyl group in the molecule, there can be mentioned monocarboxylic acids such as acrylic acid, methacrylic acid, ethacrylic acid and crotonic acid, and dicarboxylic acids such as itaconic acid, maleic acid and fumaric acid. Among them, acrylic acid and methacrylic acid are preferably used. These monomers can be used alone or in the form of mixtures of two or more thereof.

As the monomer (c) having an amino group in the molecule, there can be mentioned aliphatic amines such as 2-aminoethyl acrylate, 2-aminoethyl methacrylate, 2-aminoethyl vinyl ether and 3-aminopropyl vinyl ether, and aromatic amines such as p-aminostyrene, m-aminostyrene, p-allylaniline and m-allylaniline.

In the modified vinyl copolymer ($B_1$), the copolymerization amount of the aromatic vinyl compound (a) is 40 to 90% by weight, preferably 45 to 85% by weight, and the copolymerization amount of the vinyl cyanide compound (b) is 60 to 10% by weight, preferably 55 to 15% by weight. If the copolymerization amounts of the aromatic vinyl compound (a) and the vinyl cyanide compound (b) are outside the above-specified ranges, the mechanical strengths such as impact strength and/or the thermal stability are not satisfactory.

In the composition of the present invention, the monomer (c) having an epoxy group, a carboxyl group or an amino group exerts, in combination with the imidized arylic resin (C), an important role of improving the delustering effect and the appearance of the molded article.

The copolymerization amount of the monomer (c) having at least one member selected from the group consisting of an epoxy group, a carboxyl group and an amino group in the copolymer ($B_1$) is 0.01 to 10% by weight, preferably 0.01 to 5% by weight. If the copolymerization amount of the monomer (c) is smaller than 0.01% by weight, the delustering effect cannot be obtained. If the copolymerization amount of the monomer (c) exceeds 10% by weight, the appearance of the molded article is unsatisfactory.

Furthermore, the amount of the monomer (c) is preferably within a certain range based on the total weight of the resin composition and preferably varies depending upon the particular functional group contained therein. For example, the amount of the monomer (c) having an epoxy group in the molecule is preferably 0.001 to 0.5% by weight, more preferably 0.005 to 0.2% by weight, based on the weight of the resin composition. The amount of the monomer (c) having a carboxyl group in the molecule is preferably 0.01 to 0.3% by weight, more preferably 0.02 to 0.3% by weight, and the monomer (c) having an amino group in the molecule is preferably 0.01 to 0.8% by weight, more preferably 0.02 to 0.8% by weight, based on the weight of the resin composition.

The optional vinyl compound (d) copolymerizable with the monomers (a), (b) and (c), which constitutes the modified vinyl copolymer ($B_1$), is not particularly critical, but the same compound as the other copolymerizable vinyl compound constituting the graft copolymer (A) can be used.

A monomer (d) having a hydroxyl group in the molecule is especially preferable, because the delustering effect of the composition is further improved.

The monomer having a hydroxyl group in the molecule is a compound having both of a radical polymerizable vinyl group and a hydroxyl group. As examples of this monomer there can be mentioned those having a relatively low molecular weight such as acrylic acid and methacrylic acid esters such as 2 hydroxyethyl acrylate, 2-hydroxypropyl acrylate, 4-hydroxymethylbenzyl acrylate, 2-hydroxyethyl methacrylate, 2-hydroxypropyl methacrylate and 4-hydroxymethylbenzyl methacrylate, and vinyl aromatic compounds such as 1-hydroxymethyl-4-vinylbenzene and 1-(2-hydroxyethyl)-4-vinylbenzene; and those having a relatively high molecular weight such as compounds having a polyalkylene oxide group or a derivative thereof, e.g., compounds represented by the following formulae (IV) and (V):

$$CH_2=\underset{\underset{R^3}{|}}{C}-\overset{O}{\overset{||}{C}}-O(R^4O)_nH \quad (IV)$$

and $$CH_2=\underset{\underset{R^3}{|}}{C}-\overset{O}{\overset{||}{C}}-NH(R^4O)_nH \quad (V)$$

wherein $R^3$ represents a hydrogen atom or an alkyl group having 1 to 4 carbon atoms, $R^4$ represents an alkylene group having 2 to 6 carbon atoms, and n is an integer of 2 to 50.

As specific examples, polyethylene glycol acrylate, polyethylene glycol methacrylate, poly(propylene oxide) glycol acrylate, poly(propylene oxide) glycol methacrylate, poly(tetramethylene oxide) glycol acrylate, poly(tetramethylene oxide) glycol methacrylate, poly(hexamethylene oxide) glycol methacrylate, polyethylene glycol acrylamide, polyethylene glycol methacrylamide, poly(propylene oxide) glycol acrylamide, poly(propylene oxide) glycol methacrylamide, poly(tetramethylene oxide) glycol acrylamide and poly(tetramethylene oxide) glycol methacrylamide. polyethylene glycol methacrylate and polyethylene glycol methacrylamide are especially preferably used. These monomers can be used alone or in the form of mixtures of two or more thereof.

Preferably the amount of the monomer (d) having a hydroxyl group in the modified vinyl copolymer ($B_1$) is 0.1 to 10% by weight, more preferably 0.1 to 5% by weight, based on the weight of the modified vinyl copolymer ($B_1$), because the delustering effect of the composition is especially highly improved.

The process for the preparation of the modified vinyl copolymer ($B_1$) is not particularly critical. Conventional processes such as bulk polymerization, solution polymerization, bulk-suspension polymerization, suspension polymerization and emulsion polymerization can be adopted. The manner of charging of the copolymerization components are not particularly critical. For example, all of the monomers can be added at the initial stage, and to minimize undesirable formation of a composition distribution in the copolymer, parts or all of the monomers are continuously charged or dividedly charged to effect polymerization.

The epoxy group-, carboxyl group- or amino group-containing olefin copolymer ($B_2$) used in the present invention is a copolymer of (e) an olefin, (f) a monomer having an epoxy group, a carboxyl group or an amino group in the molecule, and (g) an optional ethylenically unsaturated compound copolymerizable therewith.

As the olefin (e), there can be mentioned ethylene, propylene, 1-butene and mixtures thereof. These olefins may be used alone or in combination. The proportion of the olefin (e) in the olefin copolymer ($B_2$) is 50 to 95% by weight, preferably 80 to 95% by weight.

The same monomers (c) as mentioned above with respect to the modified vinyl copolymer ($B_1$) can be used as the monomer (f) having an epoxy group, a carboxyl group or an amino group. The proportion of the monomer (f) in the modified vinyl copolymer ($B_2$) is 0.1 to 20% by weight. If the proportion of the monomer (f) is smaller than 0.1% by weight, the gloss-reducing effect attributed to this monomer is not manifested. If the proportion of this monomer exceeds 20% by weight, gelation occurs at the extrusion step the appearance of the molded article becomes poor, and furthermore the moldability is degraded.

The copolymerization amount of the monomer (f) having an epoxy group, a carboxyl group or an amino group in the molecule is 0.1 to 20% by weight, preferably 0.1 to 15% by weight, more preferably 0.1 to 10% by weight.

More specifically, the amount of the monomer having an epoxy group in the molecule is preferably 0.001 to 0.5% by weight, more preferably 0.005 to 0.5% by weight, based on the resin composition of the present invention. The amount of the monomer having a carboxyl group in the molecule is preferably 0.01 to 0.5% by weight, more preferably 0.05 to 0.5% by weight, based on the resin composition of the present invention. The amount of the monomer having an amino group in the molecule is preferably 0.01 to 0.8% by weight, more preferably 0.05 to 0.8% by weight, based on the resin composition of the present invention.

As the optional copolymerizable ethylenically unsaturated compound (g), there can be mentioned unsaturated alkyl esters of saturated carboxylic acids such as vinyl acetate and vinyl propionate, saturated alkyl esters of methacrylic acid and acrylic acid such as methyl methacrylate and propyl methacrylate, vinyl halides, and alkyl vinyl ethers such as ethyl vinyl ether.

The copolymerization amount of the optional ethylenically unsaturated compound (g) is 0 to 40% by weight, more preferably 0 to 30% by weight. If the copolymerization amount of the ethylenically unsaturated compound (g) to be added according to need exceeds 40% by weight, the heat stability of the final composition is often degraded.

The epoxy group-, carboxyl group- or amino group-containing olefin copolymer ($B_2$) can be prepared according to various processes. For example, there is generally adopted a process in which a mixture comprising an unsaturated glycidyl ether compound, an unsaturated carboxylic acid or an unsaturated amine and an olefin, optionally with an ethylenically unsaturated compound, is treated at a high temperature usually (100° to 400° C.) under a high pressure (usually 100 to 3,000 atmospheres) in the presence of a radical-generating agent.

In the composition of the present invention, the reactivity and compatibility between the ABS resin and the imidized acrylic resin are improved by the presence of the modified vinyl copolymer ($B_1$) or the modified olefin copolymer ($B_2$).

The imidized acrylic resin (C) in the resin composition of the present invention is preferably a polymer containing cyclic imide units represented by the following formula (VI):

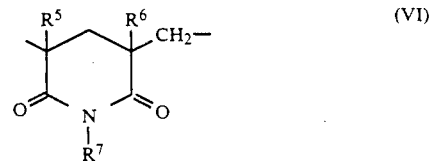

wherein $R^5$, $R^6$ and $R^7$ each represent a hydrogen atom or a substituted or unsubstituted alkyl or aryl group having 1 to 20 carbon atoms.

Various acrylic resins can be used in the present invention, irrespectively of the chemical structure, so far as they contain the above cyclic imide units. Generally, polyglutarimides in which $R^5$ and $R^6$ each represent a hydrogen atom or a methyl group and $R^7$ represents a hydrogen atom, a methyl group, an ethyl group, a propyl group, a butyl group or a phenyl group are used. The process for the preparation of the imidized acrylic resin is not particularly critical. For example, a process disclosed in Japanese Unexamined Patent Publication No. 52-63989 is advantageously adopted, in which poly(methyl methacrylate) is reacted with ammonia or a primary amine such as methylamine or ethylamine in an extruder to form a glutarimide ring.

As the aromatic vinyl compound (a) and vinyl cyanide compound (b) constituting the copolymer (D) as one constituent of the resin composition of the present invention, the same aromatic vinyl compounds and vinyl cyanide compounds as described above with respect to the graft copolymer (A) can be used.

As the optional vinyl compound (c) copolymerizable with the aromatic vinyl compound (a) and vinyl cyanide compound, the same copolymerizable monomers as mentioned above with respect to the graft copolymer (A) can be used.

The vinyl copolymer (D) optionally incorporated in the composition of the present invention is preferably a hydroxyl group-containing vinyl copolymer, because the delustering effect is further improved. As the hydroxyl group-containing vinyl copolymer, there is preferably used a polymer obtained by copolymerizing 40 to 90% by weight of an aromatic vinyl monomer, 60 to 10% by weight of a vinyl cyanide monomer, 0.1 to 10% by weight of a monomer having a hydroxyl group in the molecule and 0 to 40% by weight of another monomer copolymerizable therewith.

As the monomer having a hydroxyl group in the molecule, the same hydroxyl group-containing monomers as described above with respect to the monomer (d) of the modified vinyl copolymer ($B_1$) can be used.

If the vinyl copolymer (D) having the units derived from the monomer containing a hydroxyl group is incorporated in an amount of 1 to 30 parts by weight per 100 parts by weight of the resin composition, the delustering effect is highly improved.

Use of a maleimide type monomer as the copolymerizable monomer for the preparation of the copolymer (D) is preferred because the heat resistance is improved.

As the maleimide monomer, there can be mentioned maleimide, N-methylmaleimide, N-ethylmaleimide, N-isopropylmaleimide, N-t-butylmaleimide, N-phenylmaleimide, N-m-methylphenylmaleimide, N-o-methylphenylamaleimide, N-p-methylphenylmaleimide, N-cyclohexylamleimide, N-o-hydroxyphenylmaleimide, N-m-hydroxyphenylmaleimide, N-p-hydroxyphenylmaleimide, N-o-methoxyphenylmaleimide, N-m-methoxyphenylmaleimaide, N-p-methoxyphenylmaleimide, N-o-chlorophenylmaleimide, N-m-chlorophenylmaleimide, N-p-chlorophenylmaleimide and N-naphthylamaleimide. Among these maleimide compounds, N-phenylmaleimide, N-cyclohexylmaleimide, N-t-butylmaleimide, N-isopropylmaleimide and N-m-methylphenylmaleimide are preferable. These maleimide compounds can be used singly or in the form of mixtures of two or more thereof.

Preferably the copolymerization amount of the maleimide compound is 1 to 50% by weight, more preferably 1 to 40% by weight, based on the vinyl copolymer (D), because the heat resistance and mechanical properties such as impact resistance are improved.

The process for the preparation of the vinyl copolymer (D) is not particularly critical. For example, known processes such as solution polymerization, bulk-suspension polymerization, suspension polymerization and emulsion polymerization can be adopted. The manner of charging of the monomers to be copolymerized is not particularly critical. All of the monomers can be collectively charged at the initial stage. To minimize undesirable formation of a composition distribution, parts or all of the monomers are continuously charged or dividedly charged to effect polymerization.

The resin composition of the present invention comprises 1 to 98 parts by weight, preferably 2 to 90 parts by weight, more preferably 5 to 90 parts by weight, of the graft copolymer (A), 1 to 40 parts by weight, preferably 1 to 30 parts by weight, more preferably 1 to 25 parts by weight, of the modified vinyl copolymer ($B_1$) or modified olefin copolymer ($B_2$), 1 to 60 parts by weight, preferably 2 to 30 parts by weight, more preferably 2 to 20 parts by weight, of the imidized acrylic resin (C), and 0 to 90 parts by weight, preferably 0 to 70 parts by weight, more preferably 1 to 65 parts by weight, of the vinyl copolymer (D), per 100 parts by weight of the components (A) through (D).

If the amount of the component (A) is smaller than 1 part by weight, the impact resistance of the molded article is poor, and if the amount of the component (A) exceeds 98 parts by weight, no satisfactory gloss-reducing effect can be obtained. If the amount of the component (B) is smaller than 1 part by weight, no satisfactory gloss-reducing effect is obtained, and if the amount of the component (B) exceeds 40 parts by weight, the moldability is drastically lowered and also the appearance of the molded article becomes unsatisfactory.

In the resin composition, by incorporating the components (B) and (C) into the component (A), the surface gloss of the molded article can be drastically reduced. Namely, a molded article which is delustered to a high grade and has excellent molding processability and surface appearance can be obtained. In the resin composition of the present invention, if the component (C) is not present and a large amount of an epoxy group, a carboxyl group or an amino group is contained, the surface gloss of the molded article is reduced, but the moldability and surface appearance become unsatisfactory.

Preferably the amount of the rubbery polymer in the graft copolymer (A) is 5 to 40% by weight, more preferably 5 to 35% by weight, based on the weight of the resin composition of the present invention. If the amount of the rubbery polymer is outside the above-mentioned range, it is difficult to obtain a resin composition having well-balanced impact resistance, rigidity and thermal stability.

The process for the preparation of the resin composition of the present invention is not particularly critical. Various processes can be adopted, for example, a process in which the graft copolymer (A), the modified copolymer (B) and the imidized acrylic resin (C), optionally together with the vinyl copolymer (D), are homogeneously mixed in the state of a pellet, a powder or a finely divided pieces by using a high-speed stirrer or the like, and the mixture is melt-kneaded by a single-screw or multi-screw extruder having a high kneading capacity. Furthermore, a process can be adopted in which two or three components of the four components, for example, the graft copolymer (A) and the modified copolymer (B), or the graft copolymer (A), the modified copolymer (B) and the vinyl copolymer (D), are preliminarily kneaded, and the imidized acrylic resin (C) and, if any, additional amounts of these components are then mixed to obtain the predetermined mixing ratio, and the mixture is kneaded.

If another thermoplastic polymer such as a styrene/acrylonitrile copolymer, an α-methylstyrene/acrylonitrile copolymer, an α-methylstyrene/styrene/acrylonitrile copolymer, a styrene/methyl methacrylate/acrylonitrile copolymer, a styrene/acrylamide copolymer or poly(methyl methacrylate) is incorporated in the resin composition of the present invention, the balance of the melt flowability, heat resistance and impact resistance can be advantageously changed.

For example, when the concentration of the rubbery polymer in the graft copolymer (A) is high, a process in which at least one polymer selected from the foregoing polymers, for example, a styrene/acrylonitrile/methyl methacrylate copolymer, is added, is generally adopted.

A pigment or dye, a reinforcer such as a glass fiber, a metal fiber, a metal flake or a carbon fiber, a filler, a heat stabilizer, an antioxidant, an ultraviolet absorbant, a photostabilizer, a lubricant, a plasticizer, an antistatic agent and a flame retardant can be added to the resin composition of the present invention according to intended uses.

The present invention will now be described in detail with reference to the following examples that by no means limit the scope of the invention. All of "parts" and "%" in the examples are by weight unless otherwise indicated. The imide content in an imidized acrylic resin was measured by the $^1$H-NMR method. The finally obtained resin compositions were molded by injection molding, and the physical properties of the molded articles were determined according to the following test methods.

Izod impact strength
ASTM D-256, ⅛ inch, notched, 23° C. (kg.cm/cm)
Molding processability
The melt viscosity was measured at a resin temperature of 270° C. under a load of 50 kg by using a flow tester.
Heat distortion temperature
ASTM D-648, ¼ inch, load of 18.6 kg/cm$^2$ (°C.)
Flexural elastic modulus
ASTM D-790, ¼ inch, 23° C. (kg/cm$^2$)
Surface gloss
The light reflected from the mirror surface of the molded article at an incident angle of 60° was measured by using a digital deflection angle gloss meter (Model UGV-5D supplied by Suga Shikenki).
Surface appearance
The surface appearance of the molded article was evaluated with the naked eye and expressed by the following ratings.
A: very good
B: good
C: bad (large surface roughness, large gloss distribution)

Referential Example 1 [preparation of Graft Copolymer (A)]

A-1

In the presence of 35 parts (as solids) of a polybutadiene latex (average rubber particle diameter: 0.25 μm, gel content: 80%), 65 parts of a monomer mixture comprising 70% of styrene and 30% of acrylonitrile was emulsion-polymerized. The obtained graft copolymer was coagulated with sulfuric acid, neutralized with aqueous sodium hydroxide: washed, filtered and then dried to obtained a powdery graft copolymer (A-1).

A-2

In the presence of 65 parts (as solids) of the same polybutadiene latex as that used in A-1, 35 parts of a monomer mixture comprising 65% of styrene, 30% of acrylonitrile and 5% of methyl methacrylate was emulsion-polymerized and the post treatment was carried in the same manner as in A-1 to obtain a powdery graft copolymer (A-2).

A-3

In the presence of 15 parts (as solids) of the same polybutadiene latex as that used in A-1, 85 parts of a monomer mixture comprising 74% of styrene and 26% of acrylonitrile was emulsion-polymerized and the post treatment was carried out in the same manner as in A-1 to obtain a powdery graft copolymer (A-3).

A-4

In the presence of 35 parts (as solids) of the same polybutadiene as that used in A-1, 65 parts of a monomer mixture comprising 74% of styrene, 25.3% of acrylonitrile and 0.7% of glycidyl methacrylate was emulsion-polymerized and the post treatment was carried out in the same manner as in A-1 to obtain a powdery graft copolymer (A-4).

Referential Example 2 [Preparation of Modified Copolymer (B)]

B-1

A bead-shaped copolymer (B-1) was prepared by suspension-polymerizing a monomer mixture comprising 76% of styrene, 23% of acrylonitrile and 1% of glycidyl acrylate.

B-2

A bead-shaped copolymer (B-2) was prepared by suspension polymerizing a monomer mixture comprising 69% of styrene, 30.5% of acrylonitrile and 0.5% of glycidyl methacrylate.

B-3

A bead-shaped copolymer (B-3) was prepared by suspension-polymerizing (a monomer mixture comprising) 24% of styrene, 5.5% of acrylonitrile, 0.5% of glycidyl methacrylate and 70% of methyl methacrylate.

B-4

A bead-shaped copolymer (B-4) was prepared by suspension-polymerizing a monomer mixture comprising 70% of styrene, 25% of acrylonitrile and 5% of glycidyl acrylate.

B-5

A bead-shaped copolymer (B-5) was prepared by suspension-polymerizing a monomer mixture comprising 71% of styrene, 24% of acrylonitrile and 5% of methacrylic acid.

B-6

A bead-shaped copolymer (B-6) was prepared by suspension-polymerizing a monomer mixture comprising 68% of styrene, 24% of acrylonitrile, 4% of acrylic acid and 4% of methyl methacrylate.

B-7

A bead-shaped copolymer (B-7) was prepared by suspension-polymerizing a monomer mixture comprising 72% of styrene, 23% of acrylonitrile, 4% of acrylamide and 1% of methacrylic acid.

B-8

A bead-shaped copolymer (B-8) was prepared by suspension-polymerizing a monomer mixture comprising 72% of styrene, 26% of acrylonitrile, 1% of methacrylic acid and 1% of glycidyl methacrylate.

B-9

A bead-shaped copolymer (B-9) was prepared by suspension-polymerizing a monomer mixture comprising 73% of styrene, 24.5% of acrylonitrile, 1.8% of methacrylic acid and 0.7% of glycidyl methacrylate.

B-10

A powdery copolymer (B-10) was prepared by emulsion-polymerizing a monomer mixture comprising 70% of styrene, 25% of acrylonitrile and 5% of 2-aminoethyl methacrylate.

B-11

A powdery copolymer (B-11) was prepared by emulsion-polymerizing a monomer mixture comprising 65% of styrene, 20% of acrylonitrile, 8% of methyl methacrylate and 7% of 4-vinylphenylamine.

B-12

A powdery copolymer (B-12) was prepared by emulsion-polymerizing a monomer mixture comprising 74% of styrene, 24% of acrylonitrile and 2% of 4-vinylphenylamine.

B-13

An ordinary autoclave-type polyethylene-preparing apparatus was charged with monomeric ethylene compressed to 1,800 kg/cm$^2$, glycidyl methacrylate and a catalyst (di-t-butyl peroxide), and bulk polymerization was carried out at about 250° C. with stirring for 20 minutes. The obtained copolymer (B-13) was recovered through a separator.

B-14

A copolymer (B-14) was prepared in the same manner as in B-13 except that ethylene, glycidyl methacrylate and methyl methacrylate were used as the monomers.

B-15

A copolymer (B-15) was prepared in the same manner as in B-13 except that ethylene, glycidyl methacrylate and vinyl acetate were used as the monomers.

B-16

A copolymer (B-16) was prepared in the same manner as in B-13 except that ethylene, methacrylic acid and methyl methacrylate were used as the monomers.

B-17

A copolymer (B-17) was prepared in the same manner as in B-13 except that ethylene, propylene, methacrylic acid and vinyl acetate were used as the monomers.

B-18

A copolymer (B-18) was prepared by suspension-polymerizing a monomer mixture comprising 70% of styrene, 24.5% of acrylonitrile, 0.5% of glycidyl methacrylate and 5% of 2-hydroxyethyl methacrylate.

B-19

A copolymer (B-19) was prepared by suspension-polymerizing a monomer mixture comprising 73% of styrene, 23.5% of acrylonitrile, 1.5% of glycidyl methacrylate and 2% of 2-hydroxyethyl methacrylate.

B-20

A copolymer (B-20) was prepared by emulsion-polymerizing a monomer mixture comprising 75% of styrene, 24.8% of acrylonitrile, 0.2% of divinylbenzene.

Referential Example 3 [Preparation of Imidized Acrylic Resin (C)]

C-1

Pellets of poly(methyl methacrylate) were charged together with ammonia into an extruder, and extruded at a resin temperature of 270° C. while removing the generated gas from a vent hole of the extruder to obtain a polyglutarimide (C-1) having an imide content of 40 mole %.

C-2

A polyglutarimide (C-2) having an imide content of 52 mole % was prepared in the same manner as in C-1 except that methylamine was used as the imidizing agent instead of ammonia.

Referential Example 4 [Preparation of Vinyl Copolymer (D)]

D-1

A copolymer (D-1) was prepared by suspension-polymerizing a monomer mixture comprising 50% of styrene, 20% of acrylonitrile and 30% of N-phenylmaleimide.

D-2

A copolymer (D-2) was prepared by suspension-polymerizing a monomer mixture comprising 30% of styrene, 20% of α-methylstyrene, 20% of acrylonitrile and 30% of N-cyclohexylmaleimide.

D-3

A copolymer (D-3) was prepared by suspension-polymerizing a monomer mixture comprising 40% of styrene, 10% of α-methylstyrene, 20% of acrylonitrile and 30% of N-phenylmaleimide.

D-4

A copolymer (D-4) was prepared by suspension-polymerizing a monomer mixture comprising 75% of styrene and 25% of acrylonitrile.

D-5

A bead-shaped copolymer (D-5) was prepared by suspension-polymerizing a monomer mixture comprising: 71% of styrene, 24% of acrylonitrile and 5% of 2-hydroxyethyl methacrylate.

D-6

A bead-shaped copolymer (D-6) was prepared by suspension-polymerizing a monomer mixture comprising: 68% of styrene, 24% of acrylonitrile, 4% of 2-hydroxyethyl methacrylate and 4% of methyl methacrylate.

D-7

A bead-shaped copolymer (D-7) was prepared by suspension-polymerizing a monomer mixture comprising: 74% of styrene, 25% of acrylonitrile and 1% of 2-hydroxypropyl methacrylate.

Examples 1 through 13 and Comparative Examples 1 through 6

The graft copolymer (A), the epoxy group-containing copolymer (B-1), (B-2) (B-3) or (B-4) as the copolymer (B), the polyglutarimide (C) and the copolymer (D), prepared in the foregoing referential examples, were mixed at a mixing ratio shown in Table 1 by a Henschel mixer. The mixture was extruded at an extrusion temperature of 270° C. by an extruder having a diameter of 40 mm and pelletized. The pellet was injection-molded at a molding temperature of 270° C. and a mold temperature of 80° C. to obtain a test piece. The physical properties of the test piece were determined. The obtained results are shown in Table 1.

TABLE 1

| | Example No. | | | | | | | | | |
|---|---|---|---|---|---|---|---|---|---|---|
| | 1 | 2 | 3 | 4 | 5 | 6 | 7 | 8 | 9 | 10 |
| Composition (parts) | | | | | | | | | | |
| A-1 | 45 | 45 | 45 | 38 | 38 | 60 | — | — | — | — |
| A-2 | — | — | — | — | — | — | 20 | 20 | 20 | — |
| A-3 | — | — | — | — | — | — | — | — | — | 70 |
| A-4 | — | — | — | — | — | — | — | — | — | — |
| B-1 | 5 | — | — | 10 | — | — | 1 | — | — | 5 |
| B-2 | — | 10 | — | — | 15 | 15 | — | 2 | — | — |
| B-3 | — | — | 10 | — | — | — | — | — | 5 | — |
| B-4 | — | — | — | — | — | — | — | — | — | — |
| B-20 | — | — | — | — | — | — | — | — | — | — |
| C-1 | 6 | 6 | 6 | — | — | — | 55 | 30 | 10 | 1 |
| C-2 | — | — | — | 2 | 2 | 2 | — | — | — | — |
| D-1 | 44 | 39 | 39 | — | — | — | — | — | — | — |
| D-2 | — | — | — | 50 | 45 | 23 | — | — | — | — |
| D-3 | — | — | — | — | — | — | — | — | — | 24 |
| D-4 | — | — | — | — | — | — | 24 | 48 | 65 | — |
| Physical Properties | | | | | | | | | | |
| Izod impact strength (kgf·cm/cm/notch) | 18 | 20 | 19 | 15 | 16 | 24 | 15 | 17 | 19 | 14 |
| Flexural elastic modulus (kgf/cm$^2$) | 24500 | 24200 | 24300 | 25700 | 25300 | 22000 | 25800 | 24000 | 24000 | 29200 |
| Heat distortion temperature (°C.) | 116 | 113 | 113 | 118 | 115 | 105 | 120 | 107 | 94 | 105 |
| Molding processability ($\times 10^{-3}$ poise) | 10 | 9 | 9 | 9 | 8 | 15 | 17 | 11 | 11 | 12 |
| Reflectance (%) | 15 | 12 | 12 | 11 | 13 | 12 | 21 | 22 | 13 | 18 |
| Surface appearance | A | A | A | A | A | A | B | A | A | A |

| | Example No. | | | Comparative Example No. | | | | | |
|---|---|---|---|---|---|---|---|---|---|
| | 11 | 12 | 13 | 1 | 2 | 3 | 4 | 5 | 6 |
| Composition (parts) | | | | | | | | | |
| A-1 | — | 50 | 45 | 45 | 20 | 45 | — | — | 50 |
| A-2 | — | — | — | — | — | — | — | — | — |
| A-3 | 85 | — | — | — | — | — | 85 | — | — |
| A-4 | — | — | — | — | — | — | — | 45 | — |
| B-1 | 5 | — | — | — | — | 5 | — | — | — |
| B-2 | — | 20 | 40 | — | — | — | — | — | — |
| B-3 | — | — | — | — | — | — | — | — | — |
| B-4 | — | — | — | — | — | — | 10 | — | — |
| B-20 | — | — | — | — | — | — | — | — | 20 |
| C-1 | 1 | — | — | 6 | 55 | — | — | — | — |
| C-2 | — | 30 | 1 | — | — | — | — | — | 30 |
| D-1 | — | — | — | 49 | — | 50 | — | 55 | — |
| D-2 | — | — | — | — | — | — | — | — | — |
| D-3 | 9 | — | — | — | — | — | 5 | — | — |
| D-4 | — | — | 14 | — | 25 | — | — | — | — |
| Physical Properties | | | | | | | | | |
| Izod impact strength (kgf·cm/cm/notch) | 15 | 18 | 14 | 20 | 9 | 21 | 15 | 16 | 10 |
| Flexural elastic modulus (kgf/cm$^2$) | 27500 | 24200 | 24900 | 25800 | 26300 | 24700 | 27000 | 24000 | 24300 |
| Heat distortion temperature (°C.) | 100 | 105 | 91 | 119 | 120 | 116 | 99 | 118 | 105 |
| Molding processability ($\times 10^{-3}$ poise) | 13 | 16 | 15 | 11 | 16 | 10 | 15 | 12 | 15 |
| Reflectance (%) | 17 | 10 | 10 | 90 | 88 | 87 | 18 | 52 | 15 |
| Surface appearance | A | B | B | A | A | A | C | A | A |

Examples 14 through 25 and Comparative Examples 7 through 11

The graft copolymer (A), the carboxyl group-containing copolymer (B-5), (B-6) or (B-7) as the copolymer (B), the polyglutarimide (C) and the copolymer (D), prepared in the foregoing referential examples, were mixed at a mixing ratio shown in Table 2 by a Henschel mixer. The mixture was extruded at an extrusion temperature of 270° C. by an extruder having a diameter of 40 mm and pelletized. The pellet was injection-molded at a molding temperature of 270° C. and a mold temperature of 80° C. to obtain a test piece. The physical properties of the test piece were determined. The obtained results are shown in Table 2.

TABLE 2

| | Example No. | | | | | | | | | |
|---|---|---|---|---|---|---|---|---|---|---|
| | 14 | 15 | 16 | 17 | 18 | 19 | 20 | 21 | 22 | 23 |
| Composition (parts) | | | | | | | | | | |
| A-1 | 45 | 45 | 45 | 36 | 36 | 60 | — | — | 50 | — |
| A-2 | — | — | — | — | — | — | 20 | 20 | — | — |
| A-3 | — | — | — | — | — | — | — | — | — | 70 |
| B-5 | 5 | — | — | 10 | — | — | 1 | — | — | 10 |

TABLE 2-continued

| | | | | | | | | | | |
|---|---|---|---|---|---|---|---|---|---|---|
| B-6 | — | 6 | — | — | 14 | — | — | 2 | — | — |
| B-7 | — | — | 20 | — | — | 15 | — | — | 20 | — |
| C-1 | 5 | 5 | 5 | — | — | — | 55 | 30 | — | 1 |
| C-2 | — | — | — | 3 | 3 | 5 | — | — | 30 | — |
| D-1 | 45 | 44 | 30 | — | — | — | — | — | — | — |
| D-2 | — | — | — | 51 | 47 | 20 | — | — | — | — |
| D-3 | — | — | — | — | — | — | — | — | 19 | — |
| D-4 | — | — | — | — | — | — | 24 | 48 | — | — |
| Physical Properties | | | | | | | | | | |
| Izod impact strength (kgf · cm/cm/notch) | 18 | 19 | 20 | 16 | 16 | 26 | 15 | 17 | 18 | 14 |
| Flexural elastic modulus (kgf/cm$^2$) | 24600 | 24500 | 24400 | 25100 | 25000 | 22000 | 25900 | 24100 | 24300 | 28800 |
| Heat distortion temperature (°C.) | 116 | 116 | 107 | 119 | 116 | 104 | 120 | 106 | 105 | 102 |
| Molding processability ($\times 10^{-3}$ poise) | 10 | 10 | 11 | 9 | 9 | 14 | 18 | 15 | 16 | 8 |
| Reflectance (%) | 10 | 11 | 12 | 10 | 11 | 14 | 30 | 17 | 11 | 11 |
| Surface appearance | A | A | A | A | A | A | B | A | B | A |

| | Example No. | | Comparative Example No. | | | | |
|---|---|---|---|---|---|---|---|
| | 24 | 25 | 7 | 8 | 9 | 10 | 11 |
| Composition (parts) | | | | | | | |
| A-1 | — | — | 45 | 36 | — | — | — |
| A-2 | — | — | — | — | 1 | 20 | 20 |
| A-3 | 85 | 95 | — | — | — | — | — |
| B-5 | 10 | 3 | 5 | — | — | 18 | 0.5 |
| B-6 | — | — | — | 14 | — | — | — |
| B-7 | — | — | — | — | 30 | — | — |
| C-1 | 1 | 2 | — | — | — | — | 55 |
| C-2 | — | — | — | — | — | — | — |
| D-1 | — | — | 50 | — | — | — | — |
| D-2 | — | — | — | 50 | — | — | — |
| D-3 | 4 | — | — | — | — | — | — |
| D-4 | — | — | — | — | 69 | 62 | 24.5 |
| Physical Properties | | | | | | | |
| Izod impact strength (kgf · cm/cm/notch) | 16 | 17 | 21 | 16 | 2 | 18 | 15 |
| Flexural elastic modulus (kgf/cm$^2$) | 27500 | 24900 | 24500 | 24900 | 37300 | 23500 | 25900 |
| Heat distortion temperature (°C.) | 92 | 90 | 115 | 116 | 90 | 91 | 120 |
| Molding processability ($\times 10^{-3}$ poise) | 9 | 10 | 8 | 8 | 3 | 7 | 16 |
| Reflectance (%) | 10 | 30 | 88 | 65 | 89 | 10 | 52 |
| Surface appearance | A | A | A | A | A | C | A |

Examples 26 through 40 and Comparative Examples 12 through 14

The graft copolymer (A), the epoxy or carboxyl group-containing copolymer (B-1), (B-2), (B-6), (B-7), (B-8) or (B-9) as the copolymer (B), the polyglutarimide (C) and the copolymer (D), prepared in the foregoing referential examples, were mixed at a mixing ratio shown in Table 3 by a Henschel mixer. The mixture was extruded at an extrusion temperature of 270° C. by an extruder having a diameter of 40 mm and pelletized. The pellet was injection-molded at a molding temperature of 270° C. and a mold temperature of 80° C. to obtain a test piece. The physical properties of the test piece were determined. The obtained results are shown in Table 3.

TABLE 3

| | Example No. | | | | | | | | | |
|---|---|---|---|---|---|---|---|---|---|---|
| | 26 | 27 | 28 | 29 | 30 | 31 | 32 | 33 | 34 | 35 |
| Composition (parts) | | | | | | | | | | |
| A-1 | 45 | 45 | 45 | 45 | 60 | — | — | — | — | — |
| A-2 | — | — | — | — | — | 25 | 25 | 25 | — | — |
| A-3 | — | — | — | — | — | — | — | — | 70 | 85 |
| B-1 | 2 | — | 2 | — | 2 | — | — | — | — | — |
| B-2 | — | 5 | — | 5 | — | 25 | 25 | 35 | 1 | 2 |
| B-6 | 2 | 2 | — | — | 2 | — | 2 | — | — | — |
| B-7 | — | — | 8 | 8 | — | 2 | — | 1 | 5 | 2 |
| B-8 | — | — | — | — | — | — | — | — | — | — |
| B-9 | — | — | — | — | — | — | — | — | — | — |
| C-1 | 4 | 4 | — | — | 4 | — | — | — | 20 | 1 |
| C-2 | — | — | 4 | 4 | — | 10 | 10 | 30 | — | — |
| D-1 | 47 | 44 | 41 | 38 | 32 | — | — | — | — | — |
| D-2 | — | — | — | — | — | 38 | 38 | — | — | — |
| D-3 | — | — | — | — | — | — | — | — | — | — |
| D-4 | — | — | — | — | — | — | — | 9 | 4 | 10 |
| Physical Properties | | | | | | | | | | |
| Izod impact strength | 17 | 17 | 18 | 19 | 26 | 15 | 15 | 14 | 14 | 15 |

TABLE 3-continued

|  |  |  |  |  |  |  |  |  |  |  |
|---|---|---|---|---|---|---|---|---|---|---|
| (kgf · cm/cm/notch) | | | | | | | | | | |
| Flexural elastic modulus (kgf/cm²) | 24500 | 24300 | 24700 | 24500 | 22100 | 24900 | 24900 | 24900 | 28700 | 27100 |
| Heat distortion temperature (°C.) | 117 | 116 | 115 | 114 | 108 | 116 | 116 | 106 | 101 | 92 |
| Molding processability (×10⁻³ poise) | 11 | 11 | 10 | 10 | 14 | 14 | 14 | 17 | 8 | 6 |
| Reflectance (%) | 15 | 15 | 14 | 14 | 13 | 10 | 10 | 10 | 11 | 15 |
| Surface appearance | A | A | A | A | A | A | A | B | A | A |

|  | Example No. | | | | | Comparative Example No. | | |
|---|---|---|---|---|---|---|---|---|
|  | 36 | 37 | 38 | 39 | 40 | 12 | 13 | 14 |
| Composition (parts) | | | | | | | | |
| A-1 | — | — | 45 | 45 | 45 | 45 | 45 | 45 |
| A-2 | — | 25 | — | — | — | — | — | — |
| A-3 | 95 | — | — | — | — | — | — | — |
| B-1 | — | 1 | — | — | — | 2 | — | — |
| B-2 | 2 | — | — | — | — | — | 5 | — |
| B-6 | — | — | — | — | — | 2 | — | — |
| B-7 | 2 | 1 | — | — | — | — | 8 | — |
| B-8 | — | — | 10 | 5 | — | — | — | 5 |
| B-9 | — | — | — | — | 10 | — | — | — |
| C-1 | 1 | — | 3 | 3 | — | — | — | — |
| C-2 | — | 55 | — | — | 2 | — | — | — |
| D-1 | — | — | — | — | — | 51 | 42 | — |
| D-2 | — | — | — | — | — | — | — | — |
| D-3 | — | — | — | — | — | — | — | — |
| D-4 | — | 18 | 42 | 47 | 43 | — | — | 50 |
| Physical Properties | | | | | | | | |
| Izod impact strength (kgf · cm/cm/notch) | 18 | 16 | 18 | 19 | 18 | 18 | 20 | 21 |
| Flexural elastic modulus (kgf/cm²) | 24900 | 25100 | 23800 | 23200 | 23700 | 24400 | 24300 | 23100 |
| Heat distortion temperature (°C.) | 90 | 120 | 95 | 95 | 94 | 117 | 113 | 92 |
| Molding processability (×10⁻³ poise) | 7 | 17 | 10 | 9 | 10 | 10 | 9 | 8 |
| Reflectance (%) | 19 | 18 | 14 | 15 | 14 | 87 | 85 | 58 |
| Surface appearance | A | B | A | A | A | A | A | A |

Examples 41 through 53 and Comparative Examples 15 through 18

The graft copolymer (A), the amino group-containing copolymer (B-10), (B-11) or (B-12) as the copolymer (B), the polyglutarimide (C) and the copolymer (D), prepared in the foregoing referential examples, were mixed at a mixing ratio shown in Table 4 by a Henschel mixer. The mixture was extruded at an extrusion temperature of 270° C. by an extruder having a diameter of 40 mm and pelletized. The pellet was injection-molded at a molding temperature of 270° C. and a mold temperature of 80° C. to obtain a test piece. The physical properties of the test piece were determined. The obtained results are shown in Table 4.

TABLE 4

|  | Example No. | | | | | | | | | |
|---|---|---|---|---|---|---|---|---|---|---|
|  | 41 | 42 | 43 | 44 | 45 | 46 | 47 | 48 | 49 | 59 |
| Composition (parts) | | | | | | | | | | |
| A-1 | 45 | 45 | 45 | 36 | 36 | 60 | — | — | 50 | — |
| A-2 | — | — | — | — | — | — | 20 | 20 | — | — |
| A-3 | — | — | — | — | — | — | — | — | — | 70 |
| B-10 | 10 | — | — | 15 | — | — | 5 | — | — | — |
| B-11 | — | 10 | — | — | 15 | — | — | 5 | — | 1 |
| B-12 | — | — | 20 | — | — | 35 | — | — | 20 | — |
| C-1 | 5 | 5 | 5 | — | — | — | 20 | 20 | — | — |
| C-2 | — | — | — | 2 | 2 | 2 | — | — | 30 | 25 |
| D-1 | 40 | 40 | 30 | — | — | — | — | — | — | — |
| D-2 | — | — | — | 47 | 47 | 3 | — | — | — | — |
| D-3 | — | — | — | — | — | — | — | — | — | 4 |
| D-4 | — | — | — | — | — | — | 55 | 55 | — | — |
| Physical Properties | | | | | | | | | | |
| Izod impact strength (kgf · cm/cm/notch) | 17 | 17 | 18 | 15 | 15 | 25 | 19 | 19 | 18 | 15 |
| Flexural elastic modulus (kgf/cm²) | 24200 | 24300 | 23900 | 24800 | 24900 | 22000 | 23100 | 23200 | 24000 | 24000 |
| Heat distortion temperature (°C.) | 115 | 115 | 106 | 117 | 118 | 95 | 102 | 102 | 105 | 106 |
| Molding processability (×10⁻³ poise) | 10 | 10 | 8 | 10 | 10 | 14 | 9 | 9 | 16 | 7 |
| Reflectance (%) | 15 | 14 | 19 | 17 | 16 | 18 | 20 | 20 | 11 | 22 |
| Surface appearance | A | A | A | A | A | A | B | A | B | A |

TABLE 4-continued

|  | Example No. |  |  | Comparative Example No. |  |  |  |
|---|---|---|---|---|---|---|---|
|  | 51 | 52 | 53 | 15 | 16 | 17 | 18 |
| Composition (parts) | | | | | | | |
| A-1 | — | — | — | 45 | 45 | 45 | — |
| A-2 | — | — | 20 | — | — | — | 20 |
| A-3 | 85 | 95 | — | — | — | — | — |
| B-10 | — | — | 5 | 10 | — | — | — |
| B-11 | 5 | 3 | — | — | 10 | — | 45 |
| B-12 | — | — | — | — | — | 20 | — |
| C-1 | — | — | 55 | — | — | — | — |
| C-2 | 10 | 2 | — | — | — | — | — |
| D-1 | — | — | — | 45 | 45 | 35 | — |
| D-2 | — | — | — | — | — | — | — |
| D-3 | — | — | — | — | — | — | — |
| D-4 | — | — | 20 | — | — | — | 35 |
| Physical Properties | | | | | | | |
| Izod impact strength (kgf · cm/cm/notch) | 17 | 20 | 17 | 18 | 18 | 19 | 20 |
| Flexural elastic modulus (kgf/cm²) | 23900 | 23700 | 25500 | 24000 | 24100 | 23800 | 22800 |
| Heat distortion temperature (°C.) | 98 | 90 | 120 | 114 | 114 | 105 | 90 |
| Molding processability (×10⁻³ poise) | 8 | 9 | 16 | 9 | 10 | 8 | 2 |
| Reflectance (%) | 18 | 20 | 15 | 88 | 89 | 90 | 90 |
| Surface appearance | A | A | B | A | A | A | A |

Examples 54 through 66 and Comparative Examples 19 through 23

The graft copolymer (A), the modified olefin copolymer (B-13), (B-14), (B-15), (B-16) or (B-17) as the copolymer (B), the polyglutarimide (C) and the copolymer (D), prepared in the foregoing referential examples, were mixed at a mixing ratio shown in Table 5 by a Henschel mixer. The mixture was extruded at an extrusion temperature of 270° C. by an extruder having a diameter of 40 mm and pelletized. The pellet was injection-molded at a molding temperature of 270° C. and a mold temperature of 80° C. to obtain a test piece. The physical properties of the test piece were determined. The obtained results are shown in Table 5.

TABLE 5

|  | Example No. | | | | | | | | | |
|---|---|---|---|---|---|---|---|---|---|---|
|  | 54 | 55 | 56 | 57 | 58 | 59 | 60 | 61 | 62 | 63 |
| Composition (parts) | | | | | | | | | | |
| A-1 | 45 | 45 | 45 | 36 | 36 | 60 | — | — | — | — |
| A-2 | — | — | — | — | — | — | 20 | 20 | 25 | — |
| A-3 | — | — | — | — | — | — | — | — | — | 70 |
| B-13*1 | 4 | — | — | — | — | 4 | — | — | — | — |
| B-14*2 | — | 5 | — | — | — | — | 1 | 2 | 20 | — |
| B-15*3 | — | — | 6 | — | — | — | — | — | — | — |
| B-16*4 | — | — | — | 6 | — | — | — | — | — | — |
| B-17*5 | — | — | — | — | 6 | — | — | — | — | 10 |
| C-1 | 5 | 5 | 5 | 5 | 5 | 5 | — | — | — | 2 |
| C-2 | — | — | — | — | — | — | 55 | 30 | 30 | — |
| D-1 | 46 | 45 | 44 | — | — | 31 | — | — | — | — |
| D-2 | — | — | — | — | — | — | 24 | 48 | — | — |
| D-3 | — | — | — | — | — | — | — | — | — | 18 |
| D-4 | — | — | — | 53 | 53 | — | — | — | 25 | — |
| Physical Properties | | | | | | | | | | |
| Izod impact strength (kgf · cm/cm/notch) | 18 | 18 | 19 | 20 | 20 | 27 | 13 | 14 | 16 | 20 |
| Flexural elastic modulus (kgf/cm²) | 24500 | 24400 | 24400 | 24900 | 24900 | 21900 | 25900 | 25000 | 24000 | 24500 |
| Heat distortion temperature (°C.) | 116 | 116 | 116 | 95 | 95 | 108 | 130 | 129 | 106 | 103 |
| Molding processability (×10⁻³ poise) | 11 | 11 | 10 | 5 | 5 | 14 | 17 | 17 | 18 | 7 |
| Reflectance (%) | 10 | 11 | 11 | 12 | 12 | 10 | 16 | 16 | 11 | 11 |
| Surface appearance | A | A | A | A | A | A | B | A | B | A |

|  | Example No. | | | Comparative Example No. | | | | |
|---|---|---|---|---|---|---|---|---|
|  | 64 | 65 | 66 | 19 | 20 | 21 | 22 | 23 |
| Composition (parts) | | | | | | | | |
| A-1 | — | — | — | 45 | 45 | 45 | — | — |
| A-2 | — | — | 20 | — | — | — | — | 20 |
| A-3 | 85 | 95 | — | — | — | — | 70 | — |
| B-13*1 | — | — | — | 4 | — | — | — | — |
| B-14*2 | — | — | — | — | 45 | — | — | — |
| B-15*3 | — | — | 10 | — | — | 6 | — | — |
| B-16*4 | — | — | — | — | — | — | — | 45 |

TABLE 5-continued

| | | | | | | | | |
|---|---|---|---|---|---|---|---|---|
| B-17*5 | 20 | 3 | — | — | — | — | 10 | — |
| C-1 | 1 | 2 | — | — | — | — | — | — |
| C-2 | — | — | 5 | — | — | — | — | — |
| D-1 | — | — | — | 51 | 10 | 49 | — | — |
| D-2 | — | — | — | — | — | — | — | — |
| D-3 | 4 | — | — | — | — | — | 20 | — |
| D-4 | — | — | 65 | — | — | — | — | 35 |
| Physical Properties | | | | | | | | |
| Izod impact strength (kgf · cm/cm/notch) | 21 | 21 | 20 | 19 | 20 | 20 | 20 | 22 |
| Flexural elastic modulus (kgf/cm²) | 24000 | 23700 | 24800 | 24300 | 21500 | 24200 | 24500 | 21000 |
| Heat distortion temperature (°C.) | 95 | 92 | 95 | 116 | 100 | 116 | 103 | 90 |
| Molding processability (×10⁻³ poise) | 8 | 8 | 8 | 10 | 16 | 9 | 7 | 16 |
| Reflectance (%) | 10 | 20 | 10 | 42 | 12 | 38 | 35 | 12 |
| Surface appearance | A | A | A | A | C | A | A | C |

*1: ethylene/glycidyl methacrylate (93/7) copolymer
*2: ethylene/glycidyl methacrylate/methyl methacrylate (90/5/5) copolymer
*3: ethylene/glycidyl methacrylate/vinyl acetate (90/7/3) copolymer
*4: ethylene/methacrylic acid/methyl methacrylate (87/8/5) copolymer
*5: ethylene/propylene/methacrylic acid (60/35/5) copolymer

Examples 67 through 79 and Comparative Examples 24 through 28

The graft copolymer (A), the hydroxyl group-containing copolymer (B-18) or (B-19) as the copolymer (B), the polyglutarimide (C), and the copolymer (D), prepared in the foregoing referential examples, were mixed at a mixing ratio shown in Table 6 by a Henschel mixer. The mixture was extruded at an extrusion temperature of 270° C. by an extruder having a diameter of 40 mm and pelletized. The pellet was injection-molded at a molding temperature of 270° C. and a mold temperature of 80° C. to obtain a test piece. The physical properties of the test piece were determined. The obtained results are shown in Table 6.

TABLE 6

| | Example No. | | | | | | | | | |
|---|---|---|---|---|---|---|---|---|---|---|
| | 67 | 68 | 69 | 70 | 71 | 72 | 73 | 74 | 75 | 76 |
| Composition (parts) | | | | | | | | | | |
| A-1 | 45 | 45 | 45 | — | — | — | — | — | — | 60 |
| A-2 | — | — | — | 20 | 20 | 20 | — | — | — | — |
| A-3 | — | — | — | — | — | — | 70 | 85 | 95 | — |
| B-1 | 2 | 2 | 2 | — | — | — | — | 1 | 1 | — |
| B-2 | — | — | — | 5 | 5 | 20 | 20 | — | — | 2 |
| B-18 | — | — | — | — | — | — | — | — | — | — |
| B-19 | — | — | — | — | — | — | — | — | — | — |
| C-1 | 2 | 2 | 2 | — | — | — | 1 | 2 | 2 | — |
| C-2 | — | — | — | 2 | 2 | 25 | — | — | — | 20 |
| D-1 | 47 | 46 | 36 | — | — | — | — | — | — | — |
| D-2 | — | — | — | — | — | — | 7 | 10 | — | — |
| D-3 | — | — | — | — | — | — | — | — | — | 8 |
| D-4 | — | — | — | 71 | 71 | 33 | — | — | — | — |
| D-5 | 4 | — | — | 2 | — | — | 2 | 2 | 2 | — |
| D-6 | — | 5 | — | — | 2 | — | — | — | — | — |
| D-7 | — | — | 15 | — | — | 2 | — | — | — | 10 |
| Physical Properties | | | | | | | | | | |
| Izod impact strength (kgf · cm/cm/notch) | 19 | 19 | 21 | 21 | 21 | 15 | 18 | 19 | 22 | 26 |
| Flexural elastic modulus (kgf/cm²) | 24200 | 24200 | 23900 | 23000 | 23100 | 23900 | 24600 | 24300 | 23700 | 21900 |
| Heat distortion temperature (°C.) | 116 | 116 | 108 | 92 | 92 | 103 | 96 | 100 | 100 | 105 |
| Molding processability (×10⁻³ poise) | 11 | 11 | 10 | 4 | 4 | 17 | 7 | 9 | 10 | 15 |
| Reflectance (%) | 17 | 18 | 18 | 15 | 15 | 10 | 13 | 20 | 21 | 12 |
| Surface appearance | A | A | A | A | A | B | A | A | A | A |

| | Example No. | | | Comparative Example No. | | | | |
|---|---|---|---|---|---|---|---|---|
| | 77 | 78 | 79 | 24 | 25 | 26 | 27 | 28 |
| Composition (parts) | | | | | | | | |
| A-1 | — | 45 | 45 | 45 | — | 45 | — | 45 |
| A-2 | 20 | — | — | — | 20 | — | 20 | — |
| A-3 | — | — | — | — | — | — | — | — |
| B-1 | — | — | — | — | — | — | — | — |
| B-2 | — | — | — | — | — | — | — | — |
| B-18 | 3 | — | — | — | — | — | 3 | — |
| B-19 | — | 10 | 5 | — | — | — | — | 45 |
| C-1 | — | 3 | 3 | 2 | — | 2 | — | — |
| C-2 | 55 | — | — | — | 2 | — | — | — |
| D-1 | — | — | — | 49 | — | 48 | — | — |
| D-2 | — | — | — | — | — | — | — | — |

TABLE 6-continued

| | | | | | | | | |
|---|---|---|---|---|---|---|---|---|
| D-3 | — | — | — | — | — | — | — | — |
| D-4 | 22 | 42 | 47 | — | 76 | — | 77 | 10 |
| D-5 | — | — | — | 4 | 2 | — | — | — |
| D-6 | — | — | — | — | — | 5 | — | — |
| D-7 | — | — | — | — | — | — | — | — |
| Physical Properties | | | | | | | | |
| Izod impact strength (kgf·cm/cm/notch) | 17 | 21 | 21 | 20 | 22 | 20 | 24 | 21 |
| Flexural elastic modulus (kgf/cm$^2$) | 25200 | 23100 | 23000 | 24000 | 22900 | 23800 | 22900 | 23200 |
| Heat distortion temperature (°C.) | 120 | 92 | 92 | 116 | 92 | 115 | 90 | 90 |
| Molding processability ($\times 10^{-3}$ poise) | 16 | 5 | 5 | 10 | 3 | 10 | 3 | 5 |
| Reflectance (%) | 10 | 15 | 18 | 87 | 89 | 89 | 80 | 13 |
| Surface appearance | B | A | A | A | A | A | A | C |

From the results obtained in the foregoing examples and comparative examples, the following can be seen.

In each of the thermoplastic resin compositions of the present invention, the surface gloss of the molded article is uniformly reduced and a high-grade delustering effect can be obtained, and impact resistance is improved.

In contrast, when the functional group-containing copolymer (B) is not incorporated (Comparative Examples 1, 2 and 24 through 26), the reduction of the gloss is not caused, and when the polyglutarimide (C) is not incorporated (Comparative Examples 3, 4, 7 through 10, 12 through 19, 21, 22 and 27), the reduction of the surface gloss is unsatisfactory or the surface appearance is degraded.

In the composition where the epoxy group-containing monomer is grafted onto the rubber component (Comparative Example 5), the reduction of the surface gloss is unsatisfactory. In the composition where the polyfunctional monomer is used (Comparative Example 6), the impact resistance is unsatisfactory.

When the amount of the functional group-containing copolymer (B) is outside the range specified in the present invention, the reduction of the surface gloss is unsatisfactory (the amount is too small; Comparative Example 11), or the surface appearance is degraded though the surface gloss is reduced (the amount is too large; Comparative Examples 20, 23 and 28).

As is apparent from the foregoing description, in the thermoplastic resin composition of the present invention, a high surface-delustering effect is obtained without degradation of the mechanical properties of the molded article, and therefore, the composition of the present invention is suitably used as a molding material for internal trims of automobiles and exterior parts of household electrical appliances.

We claim:

1. A resin composition comprising, based on 100 parts by weight of the following components (A) through (D), (A) from 1 to 98 parts by weight of a graft copolymer obtained by graft-polymerizing (a) from 5 to 80% by weight of a rubbery polymer and (b) from 95 to 20% by weight of a monomer mixture consisting of from 40 to 90% by weight of an aromatic vinyl compound, from 60 to 10% by weight of a vinyl cyanide compound and from 0 to 50% by weight of another ethylenically unsaturated compound copolymerizable therewith, (B) from 1 to 40 parts by weight of at least one modified copolymer selected from the group consisting of ($B_1$) a modified vinyl copolymer obtained by polymerizing (a) from 40 to 90% by weight of an aromatic vinyl compound, (b) from 60 to 10% by weight of a vinyl cyanide compound, (c) from 0.01 to 10% by weight of an ethylenically unsaturated monomer having at least one member selected from the group consisting of an epoxy group, a carboxyl group and an amino group, and (d) from 0 to 40% by weight of another ethylenically unsaturated compound, and ($B_2$) a modified olefinic copolymer obtained by copolymerizing (e) from 50 to 95% by weight of at least one olefin selected from the group consisting of ethylene and propylene, (f) from 0.1 to 20% by weight of an ethylenically unsaturated monomer having at least one member selected from the group consisting of an epoxy group, a carboxyl group and an amino group, and (g) from 0 to 40% by weight of another ethylenically unsaturated compound copolymerizable therewith, (C) from 1 to 60 parts by weight of an imidized acrylic resin which is a polymer containing cyclic imide units represented by the following formula (VI):

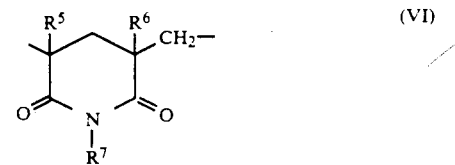

wherein $R^5$, $R^6$, and $R^7$ each represent a hydrogen atom or a substituted or unsubstituted alkyl or aryl group having 1 to 20 carbon atoms, and (D) from 0 to 90 parts by weight of a vinyl copolymer obtained by polymerizing (a) from 40 to 90% by weight of an aromatic vinyl compound, (b) from 60 to 10% by weight of a vinyl cyanide compound and (c) from 0 to 40% by weight of another ethylenically unsaturated compound copolymerizable therewith, wherein the content of the rubbery polymer (a) in the graft copolymer (A) is 5 to 40% by weight based on the total weight of the resin composition.

2. A resin composition according to claim 1, wherein the amount of the imidized acrylic resin (C) is 2 to 30 parts by weight.

3. A resin composition according to claim 1, wherein the amount of the imidized acrylic resin (C) is from 2 to 20 parts by weight.

4. A resin composition according to claim 1, wherein the other vinyl monomer (d) in the modified vinyl copolymer ($B_1$) has a hydroxyl group and the amount of the monomer (d) is from 0.1 to 10% by weight based on the weight of the copolymer ($B_1$).

5. A resin composition according to claim 1, wherein the other vinyl monomer (g) in the modified olefinic copolymer ($B_2$) has a hydroxyl group and the amount of the monomer (g) is from 0.1 to 10% by weight based on the weight of the copolymer ($B_2$).

6. A resin composition according to claim 1, wherein the vinyl copolymer (D) contains from 1 to 30 parts by weight of a vinyl copolymer having a hydroxyl group, which is obtained by polymerizing from 40 to 90% by weight of an aromatic vinyl compound, from 60 to 10% by weight of a vinyl cyanide compound, from 0.1 to 10% by weight of a monomer having a hydroxyl group and from 0 to 40% by weight of another vinyl compound copolymerizable therewith.

7. A resin composition according to claim 1, wherein the ethylenically unsaturated monomer (c) in the modified vinyl copolymer ($B_1$) has an epoxy group and the amount of the ethylenically unsaturated monomer (c) is from 0.001 to 0.5% by weight based on the total weight of the resin composition.

8. A resin composition according to claim 1, wherein the ethylenically unsaturated monomer (c) in the modified vinyl copolymer ($B_1$) has a carboxyl group and the amount of the ethylenically unsaturated monomer (c) is from 0.01 to 0.3% by weight based on the total weight of the resin composition.

9. A resin composition according to claim 1, wherein the ethylenically unsaturated monomer (c) in the modified vinyl copolymer ($B_1$) has an amino group and the amount of the ethylenically unsaturated monomer (c) is from 0.01 to 0.8% by weight based on the total weight of the resin composition.

10. A resin according to claim 1, wherein the ethylenically unsaturated monomer (c) in the modified vinyl copolymer ($B_1$) comprises an ethylenically unsaturated monomer ($C_1$) having an epoxy group and an ethylenically unsaturated monomer ($C_2$) having a carboxyl group, and the amounts of the monomers ($C_1$) and ($C_2$) are 0.001 to 0.2% by weight and 0.01 to 0.3% by weight, respectively, based on the total weight of the resin composition.

* * * * *